United States Patent
Chang et al.

(10) Patent No.: US 8,217,999 B2
(45) Date of Patent: Jul. 10, 2012

(54) LIGHT SOURCE FOR VISION MEASURING INSTRUMENT AND POSITIONING SYSTEM USING THE SAME

(75) Inventors: Chih-Kuang Chang, Taipei Hsien (TW); Li Jiang, Shenzhen (CN); Dong-Hai Li, Shenzhen (CN); Zhong-Kui Yuan, Shenzhen (CN); Xiao-Guang Xue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 503 days.

(21) Appl. No.: 12/430,127

(22) Filed: Apr. 27, 2009

(65) Prior Publication Data

US 2010/0165086 A1   Jul. 1, 2010

(30) Foreign Application Priority Data

Dec. 31, 2008   (CN) .......................... 2008 1 0306759

(51) Int. Cl.
*H04N 7/18* (2006.01)

(52) U.S. Cl. ............ 348/79; 348/345; 348/80; 700/108; 700/259

(58) Field of Classification Search .................... 348/61, 348/79–81, 94–95, 207.1, 207.11, 211.99, 348/211.4, 211.7, 211.8, 240.99, 240.1–240.3, 348/333.11, 333.12, 345–347, 350; 345/173, 345/204, 207, 660, 676–677, 698, 428; 382/128, 382/141, 148, 293, 299; 715/211, 725–726, 715/848–852
See application file for complete search history.

(56) References Cited

U.S. PATENT DOCUMENTS

| | | | | |
|---|---|---|---|---|
| 5,515,201 | A * | 5/1996 | Omi | 359/385 |
| 6,226,118 | B1 * | 5/2001 | Koyama et al. | 359/380 |
| 6,384,968 | B1 * | 5/2002 | Ito et al. | 359/389 |
| 6,385,507 | B1 * | 5/2002 | Buijtels | 700/245 |
| 6,452,625 | B1 * | 9/2002 | Kapitza | 348/80 |
| 6,621,065 | B1 * | 9/2003 | Fukumoto et al. | 250/216 |
| 6,917,377 | B2 * | 7/2005 | Aizaki et al. | 348/79 |
| 6,983,066 | B2 * | 1/2006 | Mahon et al. | 382/141 |
| 7,006,675 | B2 * | 2/2006 | Olschewski | 382/128 |
| 7,432,486 | B2 * | 10/2008 | Tanemura et al. | 250/201.3 |
| 7,590,276 | B2 * | 9/2009 | Delaney | 382/141 |
| 7,627,395 | B2 * | 12/2009 | Sadighi et al. | 700/245 |
| 7,792,338 | B2 * | 9/2010 | Bacus et al. | 382/128 |
| 8,085,295 | B2 * | 12/2011 | Tobiason et al. | 348/79 |
| 2004/0175027 | A1 * | 9/2004 | Mahon et al. | 382/141 |
| 2004/0223053 | A1 * | 11/2004 | Gladnick et al. | 348/79 |
| 2008/0100703 | A1 * | 5/2008 | Yamada | 348/79 |
| 2008/0204551 | A1 * | 8/2008 | O'Connell et al. | 348/79 |
| 2008/0266440 | A1 * | 10/2008 | Yazdanfar et al. | 348/340 |
| 2008/0273776 | A1 * | 11/2008 | Krief et al. | 382/128 |

(Continued)

*Primary Examiner* — Greg C Bengzon
(74) *Attorney, Agent, or Firm* — Altis Law Group, Inc.

(57) ABSTRACT

A light source is configured to be mounted to a vision measuring instrument that includes a primary image capture unit capturing an image of an object to be measured, and an auxiliary image capture unit providing a means to aim the primary image capture unit at a determined position. The light source includes a main body defining a through hole for receiving the primary image capture unit, and a mounting hole for readily mounting an auxiliary image capture unit. A luminescent surface is formed on an inner wall bounding the through hole of the main body. A number of light-emitting diodes (LEDs) is disposed on the luminescent surface.

5 Claims, 5 Drawing Sheets

U.S. PATENT DOCUMENTS

| | | |
|---|---|---|
| 2009/0109285 A1* | 4/2009 | Tobiason et al. .................. 348/79 |
| 2009/0195688 A1* | 8/2009 | Henderson et al. ............ 348/345 |
| 2009/0253966 A1* | 10/2009 | Ichimura ........................ 600/175 |
| 2010/0007727 A1* | 1/2010 | Torre-Bueno ................... 348/79 |
| 2010/0060729 A1* | 3/2010 | Wetzel et al. ................... 348/79 |
| 2010/0152877 A1* | 6/2010 | Maenishi ....................... 700/108 |
| 2010/0158343 A1* | 6/2010 | Bryll ............................. 382/141 |
| 2010/0194874 A1* | 8/2010 | Bierhoff et al. .................. 348/80 |
| 2010/0231703 A1* | 9/2010 | Varga et al. ..................... 348/79 |

* cited by examiner

LIGHT SOURCE FOR VISION MEASURING INSTRUMENT AND POSITIONING SYSTEM USING THE SAME

BACKGROUND

1. Technical Field

The present disclosure relates to light sources and positioning systems using the light sources and, more particularly, to a light source and a positioning system using the light source.

2. Description of the Related Art

Vision measuring instruments provide non-contact means to measure dimensions of objects. A Vision measuring instrument usually includes an image capture unit to capture an image of an object for measurement, a display showing the image captured by the image capture unit, and a light source illuminating the object. The image capture unit may be a CCD (Charge Coupled Device) camera, and the light source may be annularly placed around the image capture unit.

To accurately measure a micro region of the object, the image capture unit should zoom in on the micro region to show a magnified image of the micro region of the object via the display. When there is a plurality of micro regions to be measured, the image capture unit should capture images of the micro regions one by one. It is difficult to precisely and promptly make the imaging capture unit aim at a selected micro region.

DETAILED DESCRIPTION

Figure 1:
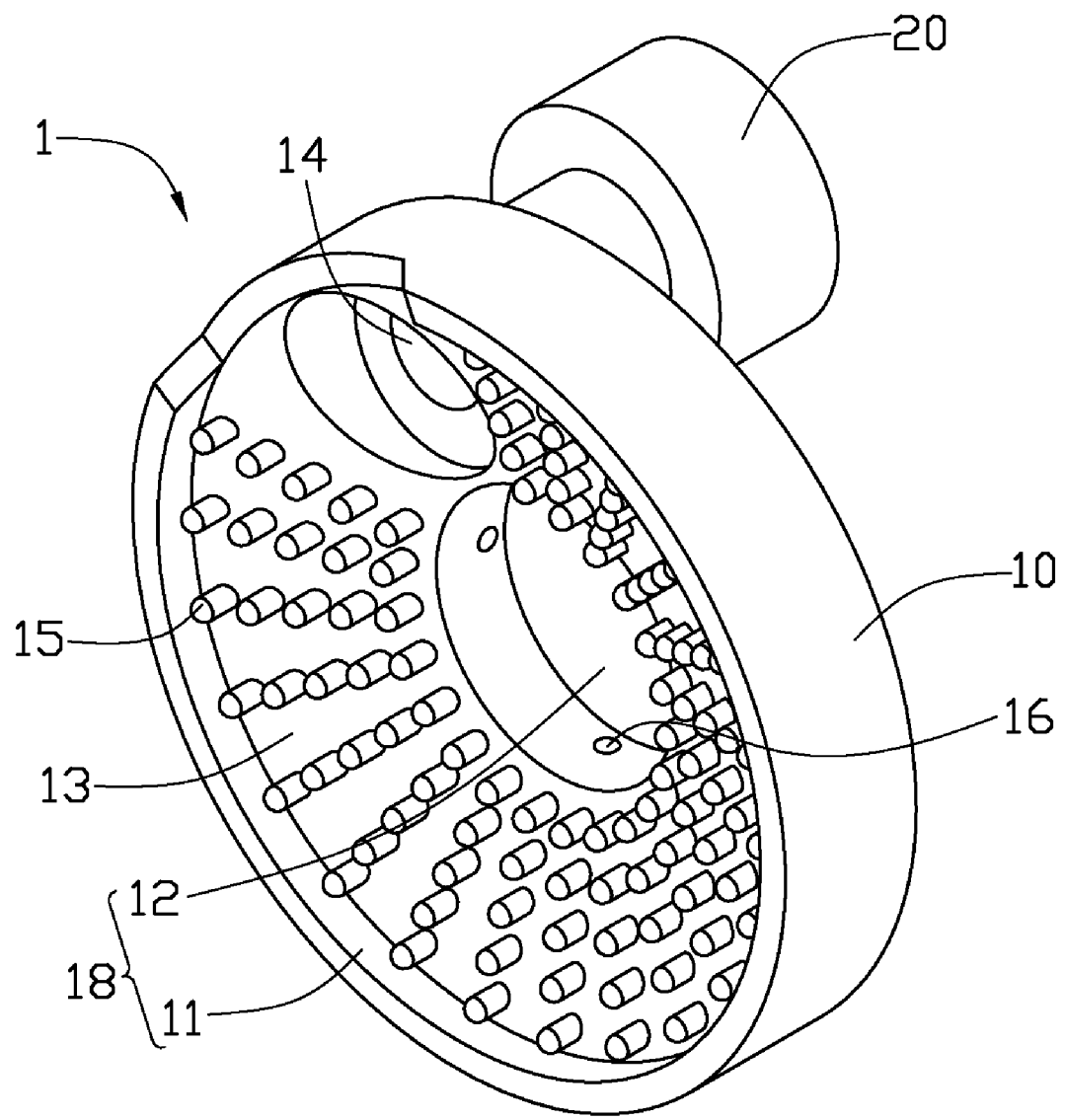
FIG. 1 is an isometric view of an embodiment of a light source.
Figure 2:
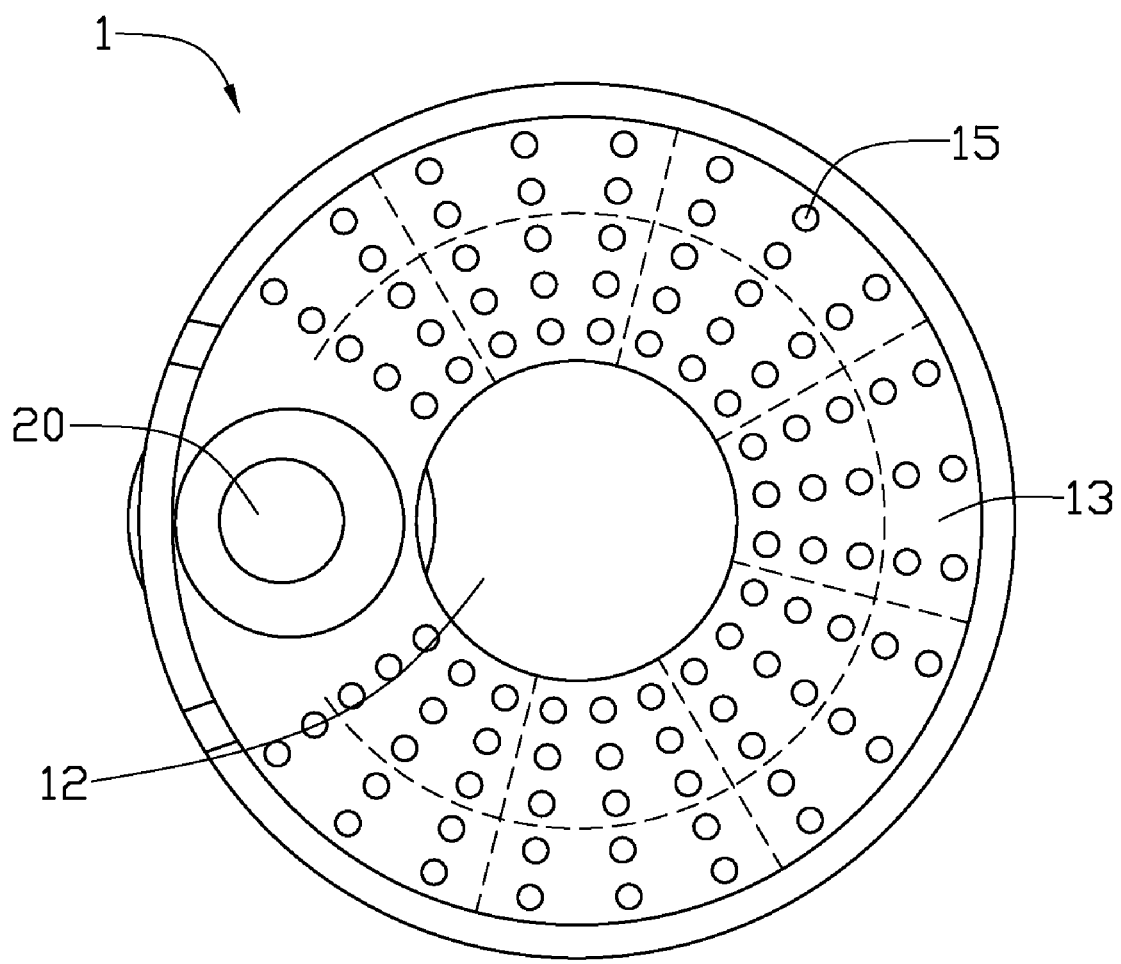
FIG. 2 is a front elevational view of the light source FIG. 1.
Figure 3:
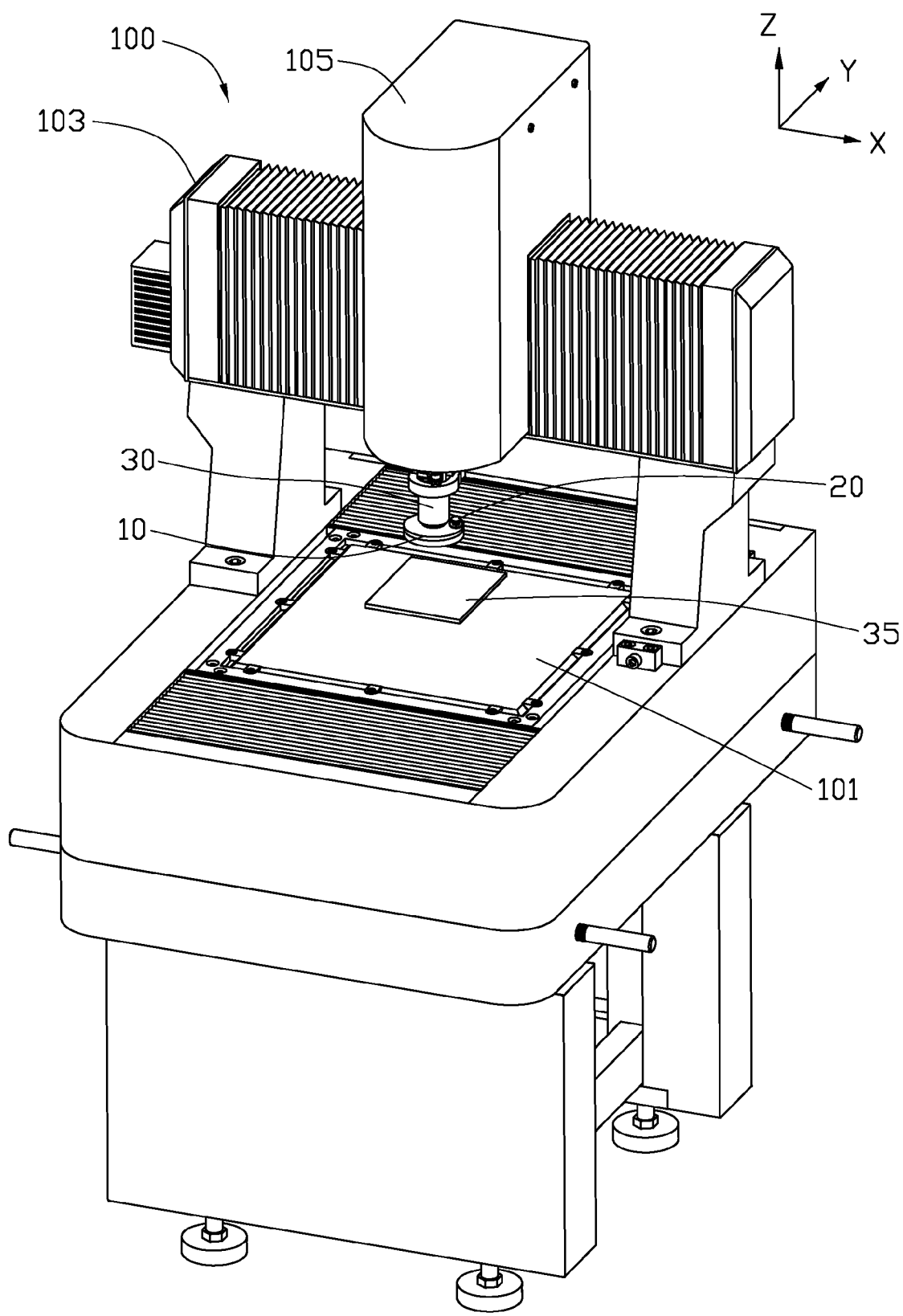
FIG. 3 is an assembled view of the light source of FIG. 1 and a vision measuring instrument.

Referring to FIGS. 1-3, an embodiment of a light source 1 can be installed to a vision measuring instrument 100. The light source 1 includes a cylindrical main body 10. A stepped through hole 18 is defined in the main body 10. The through hole 18 includes a great portion 11 and a small portion 12 adjacent to opposite sides of the main body 10, respectively. A cone-shaped luminescent surface 13 is formed in an inner wall of the great portion 11 of the through hole 18. A plurality of securing holes 16 is defined in an inner wall bounding the small portion 12 of the through hole 18. A primary image capture unit 30 (shown in FIG. 3) can be inserted in the small portion 12 of the through hole 18, and secured within via a plurality of fasteners, such as screws, cooperating with the securing holes 16. The luminescent surface 13 defines a mounting hole 14 for readily mounting an auxiliary image capture unit 20.

A plurality of light-emitting diodes (LEDs) 15 is disposed on the luminescent surface 13. The plurality of LEDs 15 is arrayed in concentric rings relative to a central axis of the main body 10. The luminescent surface 13 is divided into a plurality of zones by contours and radiuses of the rings. A controlling means is provided to selectively energize the LEDs 15 in one or more zones. Therefore, an object to be measured can be illuminated from different angles.

The vision measuring instrument 100 includes a horizontal worktable 101, a bracket 103, and a top cover 105. The bracket 103 is mounted above the worktable 101. The top cover 105 is mounted to a middle part of the bracket 103. The primary image capture unit 30 is coupled to the top cover 105 and extends downwards. The auxiliary image capture unit 20 is installed to the light source 1 by securing the auxiliary image capture unit 20 in the mounting hole 14 of the main body 10. The light source 1 with the auxiliary image capture unit 20 is mounted to a bottom of the primary image capture unit 30 by securing the primary image capture unit 30 in the small portion 12 of the through hole 18 of the main body 10. An object 35 to be measured is placed on the worktable 101. In one embodiment, the primary image capture unit 30 is a high resolution digital camera, capable of zooming in on a micro region of the object 35, and capturing a detailed image of the micro region. The auxiliary image capture unit 20 can capture an image of a wider region than the primary image capture unit 30 can.

Figure 4:
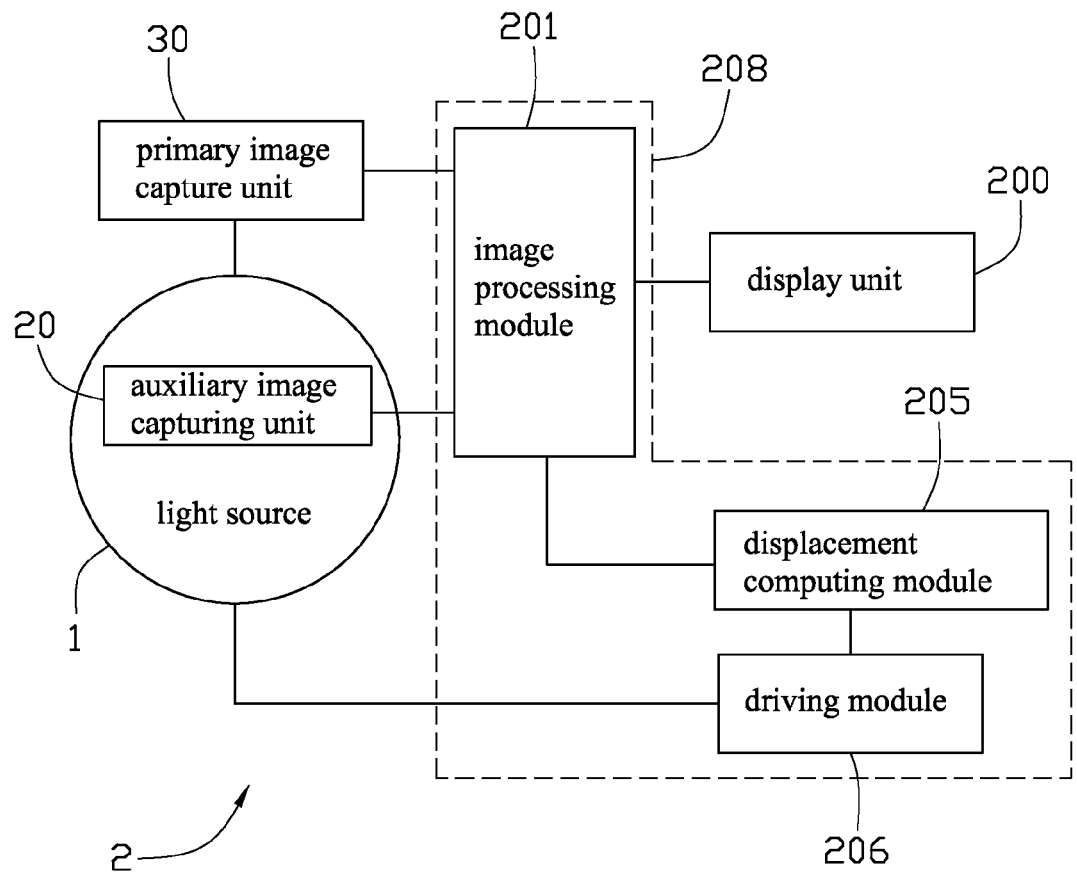
FIG. 4 is a block diagram of an embodiment of a positioning system using the light source of FIG. 1, the positioning system includes a display unit.

FIG. 4 shows a block diagram of an embodiment of a positioning system 2 to aim the primary image capture unit 30 of the vision measuring instrument 100 at a selected region of the object 35 to be measured. The positioning system 2 includes a processing unit 208, a display unit 200, a light source 1 and an auxiliary image capture unit 20 as mentioned above. The processing unit 208 is coupled to the primary image capture unit 30, the auxiliary image capture unit 20, and the display unit 200. The processing unit 208 includes an image processing module 201, a displacement computing module 205, and a driving module 206. In one embodiment, the display unit 200 is a monitor.

Figure 5:
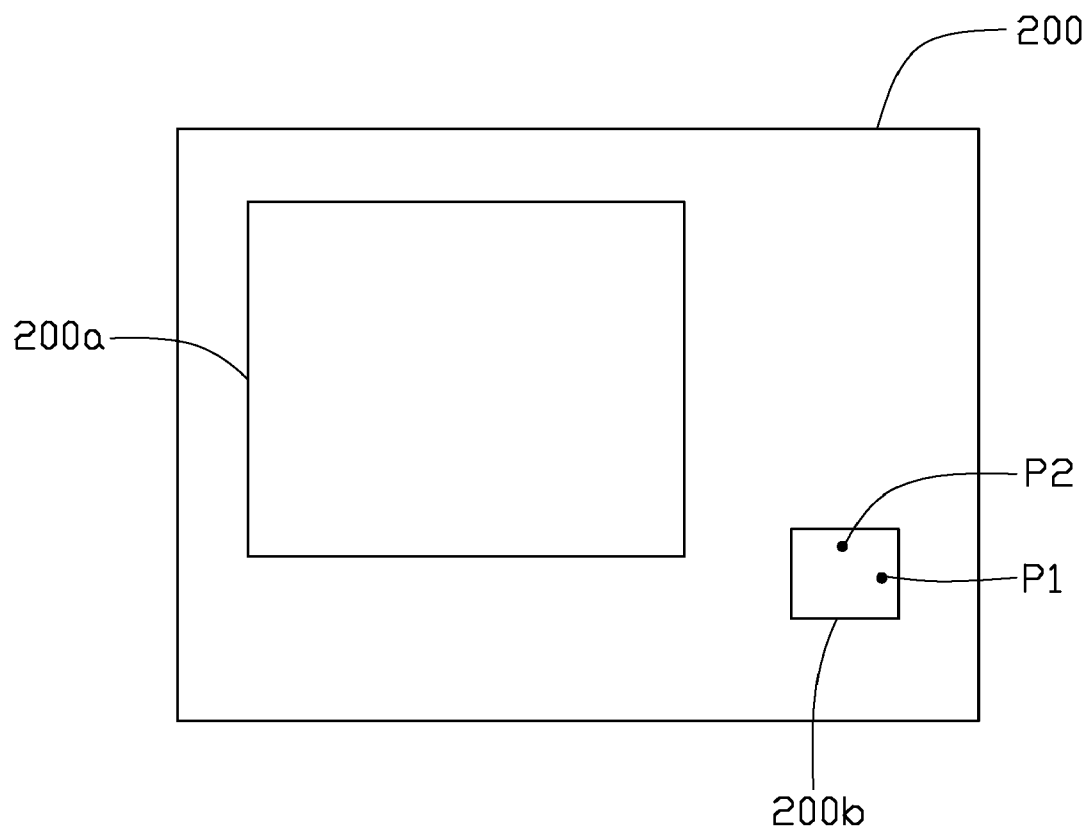
FIG. 5 is a schematic illustration of the display unit of the positioning system of FIG. 4.

Referring also to FIG. 5, the image processing module 201 converts images captured by the primary image capture unit 30 and the auxiliary image capture unit 20 into digital signals, and transfers the digital signals to the display unit 200. According to the digital signals transferred from the image processing module 201, the display unit 200 defines a big first window 200a to show the image captured by the primary image capture unit 30, and a small second window 200b to show the image captured by the auxiliary image capture unit 20.

Referring to FIGS. 3 and 4, in use, for accurately measuring a first micro region of the object 35, an image zoomed in on the first micro region of the object 35 is shown in the first window 200a of the display unit 200. At the same time, the second window 200b of the display unit 200 shows an image of at least a wide region of the object 35 including the first micro region, or a full image of object 35. The first micro region of the object 35 shown in the second window 200b of the display unit 200 is represented by a first reference point P1. A relative position of the first micro region of the object 35, i.e. the first reference point P1 shown in the second window 200b of the display unit 200 depends on a relative position of the first image capture unit 30 with regard to the second image capture unit 20.

To measure a second micro region of the object 35, a second reference point P2 in the second window 200b corresponding to the second micro region is selected by mouse clicking or finger touching. The displacement computing module 205 computes a displacement of the primary image capture unit 30 from a current position aiming the first micro region to a position aiming the second micro region, on the basis of the relative positions of the first reference point P1 and the second reference point P2 in the second window 200b of the display unit 200. According to the displacement computed by the displacement computing module 205, the driving module 206 outputs a signal to actuate a movement of the primary image capture unit 30 with regard to the object 35, thereby precisely aiming the primary image capture unit 30 at the second micro region of the object 35.

The foregoing description of the various inventive embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others of ordinary skill in the art to utilize the disclosure and various embodiments and with various modifications as are suited to the particular use contemplated. Alternately embodiments will become apparent to those of ordinary skill in the art to which the present disclosure pertains without departing from its spirit and scope. Accordingly, the scope of the present disclosure is defined by the appended claims rather than the foregoing description and the various inventive embodiments described therein.

What is claimed is:

1. A positioning system for a vision measuring instrument, the positioning system comprising:
    a primary image capture unit capable of capturing an image of a selected micro region of an object for measuring;
    a light source configured to be attached to the primary image capture unit to illuminate the object;
    an auxiliary image capture unit secured to said light source to capture an image of a region wider than and including the selected micro region, wherein said light source is mounted to a bottom of the primary image unit;
    a display unit capable of showing images captured by the primary image capture unit and the auxiliary image capture unit, respectively; and
    a processing unit coupled to the primary image capture unit, the auxiliary image capture unit, and the display unit;
    wherein the processing unit is capable of controlling a movement of the primary image capture unit with regard to the object, thereby making the primary image capture unit aim at said selected micro region.

2. The positioning system of claim 1, wherein the display unit defines a first window to show an image captured by the first image capture unit, and a second window to show an image captured by the second image capture unit.

3. The positioning system of claim 2, wherein the image shown in the first window is a zoom image of a current micro region of the object to be measured, and the image shown in the second window is an image of a wide region including the current micro region of the object, or a full image of the object.

4. The positioning system of claim 3, wherein the processing unit comprises:
    an image processing module capable of converting images captured by the primary image capture unit and the auxiliary image capture unit to digital signals, and transferring the digital signals to the display unit, therefore the display unit showing corresponding images according to the digital signals;
    a displacement computing module capable of computing a displacement of the primary image capture unit from a current position to a position aiming at said selected micro region of the object, on the basis of relative positions of the current micro region and said selected micro region of object shown in the second window of the display unit; and
    a driving module capable of actuating a movement of the first image capture unit with regard to the object, corresponding to the displacement computed by the displacement computing module.

5. The positioning system of claim 3, wherein the first window is greater than the second window.

* * * * *